No. 762,701. PATENTED JUNE 14, 1904.
O. E. GAY.
LUBRICATOR.
APPLICATION FILED MAR. 16, 1904.
NO MODEL.

WITNESSES:
Fred'k P. Bradford
Perry B. Turpin

INVENTOR
Oliver E. Gay.
BY Munn & Co.
ATTORNEYS

THE NORRIS PETERS CO., PHOTO-LITHO., WASHINGTON, D. C.

No. 762,701.

Patented June 14, 1904.

UNITED STATES PATENT OFFICE.

OLIVER E. GAY, OF ROCKYMOUNT, NORTH CAROLINA.

LUBRICATOR.

SPECIFICATION forming part of Letters Patent No. 762,701, dated June 14, 1904.

Application filed March 16, 1904. Serial No. 198,374. (No model.)

*To all whom it may concern:*

Be it known that I, OLIVER E. GAY, a citizen of the United States, and a resident of Rockymount, in the county of Edgecombe and State of North Carolina, have made certain new and useful Improvements in Lubricators, of which the following is a specification.

My invention is an improvement in lubricators, and especially in lubricators of the sight-feed class intended particularly for use on locomotives where several sight-feeds are used in connection with the different cylinders, the air-pump, &c.; and the present invention has for an object to provide a novel construction whereby to minimize the danger of breaking the glass through which the feed is seen and to provide for renewing such glass in each sight device without stopping the operation of lubricating the other cylinder or the air-pump-lubricating devices connecting with the same cup; and the invention consists in certain novel constructions and combinations of parts, as will be hereinafter described and claimed.

Figure 1:
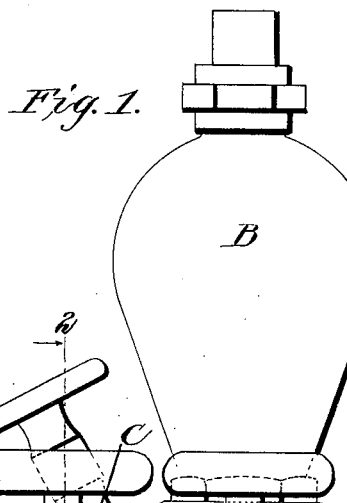
Figure 2:
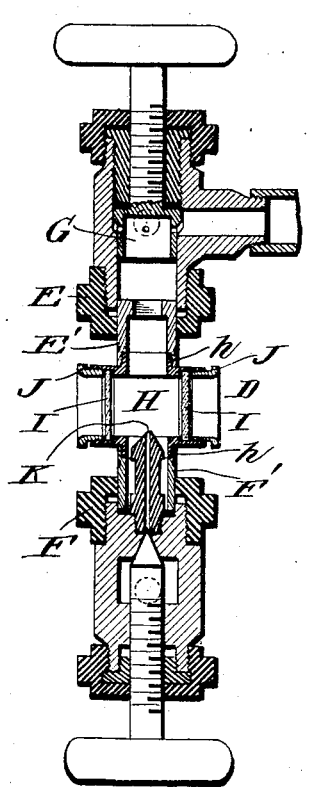
Figure 3:
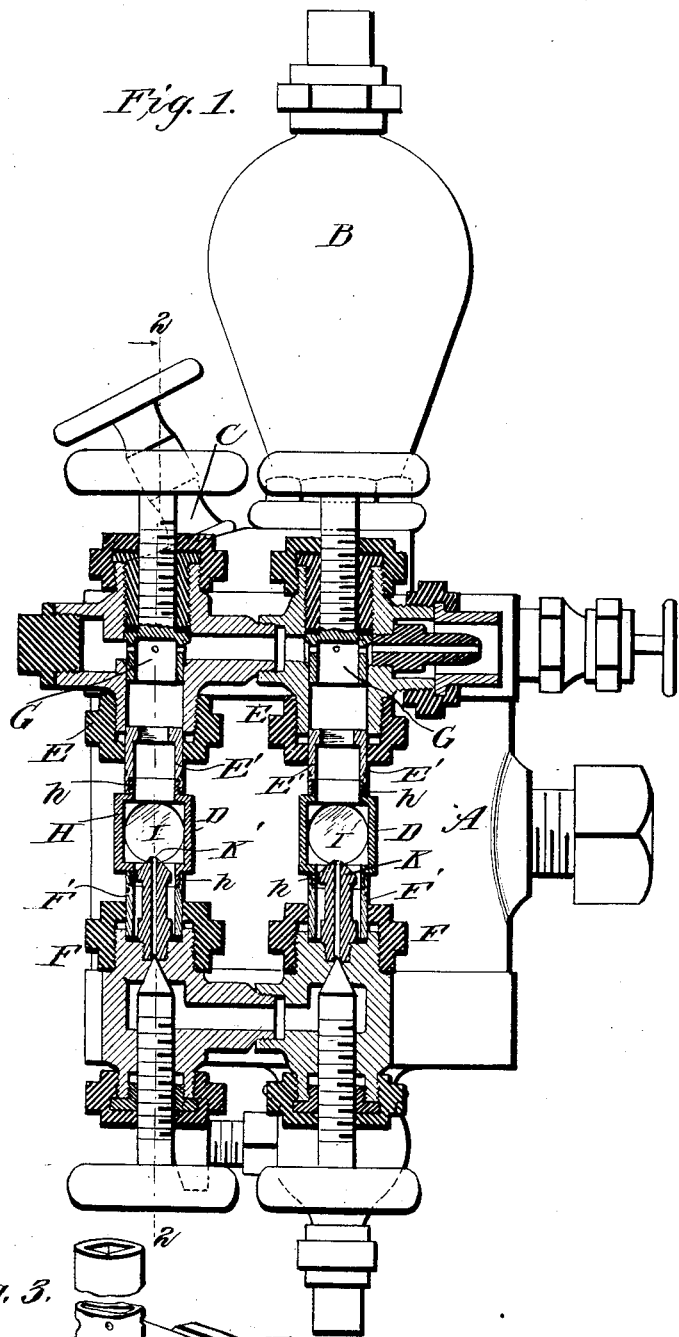
Figure 3:
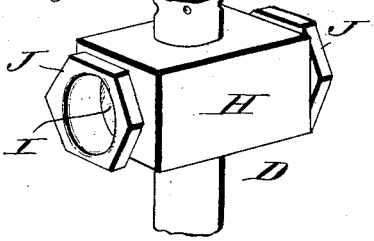

In the drawings, Figure 1 is a sectional elevation of a lubricating-cup provided with my improvements. Fig. 2 is a detail vertical section on about line 2 2 of Fig. 1, and Fig. 3 is a detail perspective view of the sight-feed device.

The cup A, with the superposed condenser B, may be of ordinary construction and may be supplied with oil through a suitable feed at C. This cup is provided with several sight-feed devices D, one of which ordinarily is designed for use in conducting the lubricant to each cylinder, while others may be provided for conducting the lubricant to the air-pump or for other purposes. Where the ordinary glass tube is used as the sight-feed device between the upper and lower couplings E and F, the extent of the glass tube is such as to increase the liability of the same being broken, and in case one of the tubes is broken it can only be renewed by removing the valve G from the upper coupling and drawing the glass tube out through the upper coupling, or when the glass tube is so broken that it can be readily removed without removing the said valve it is necessary to remove the valve G in order to insert another tube. When this valve G is removed, it opens communication between the cup and the atmosphere and the steam will escape, so that when it becomes necessary to renew one of the broken glass tubes the operator must close the main steam-valve leading to the condenser and also the feed-valves of the lubricator and the top valve and bottom feed-valve of the broken feed, thus shutting off the supply of lubricant to the cylinders or air-pump designed to be supplied through the sight-feed devices which have not been broken. To avoid this and to permit the valve G and bottom feed-valve of any given sight device to be closed when such sight device is broken without interfering with the other sight-feed devices is the purpose of the special construction embodied in my invention and which I will now describe. Each coupling E or F is connected with the lubricant-cup, and valves are provided controlling such connection, so that any pair of couplings can be shut out of connection with the lubricant-cup whenever desired.

The sight-feed devices include a transversely-extending sight-cylinder H, open at its ends and having glass plates I fitting in its ends and detachably secured in place by cap-rings J, screwed into the ends of the cylinder and pressing the plates I against shoulders provided therein, suitable packing being provided on opposite sides of the plates I, as best shown in Fig. 2 of the drawings. On its upper and lower sides the cylinder H is provided with threaded nipples $h$, on which are screwed the upper and lower pipe-sections E' and F', the latter fitting at their other ends in the couplings E and F and being suitably packed therein, as will be understood by those skilled in the art. These tube-sections may be provided at their threaded ends with sockets to receive a spanner-wrench and may have their outer ends formed with angular bores to receive a suitable square or other wrench by which to turn said tube-section into and out of connection with the cylinder H whenever desired.

It will be noticed from the foregoing description that the plates I can be readily removed and renewed whenever broken without removing the valve G, it being only necessary to close said valve G and bottom feed-valve and repair the sight-cylinder. This will require but a few minutes time, and if a glass is not convenient to the locomotive-engineer he can slip any suitable metal disk, such as a coin of proper size, in place of the broken glass plate and the operation may proceed as before. As shown, I prefer to extend the nozzle K, through which the drops of oil pass to the sight-feed, to a point at or slightly above the lower edges of the opposite glass plates, so the operator can see the drops of oil as they discharge from the nozzle.

It will be understood that an important feature of my invention is the provision of a sight-feed device between the two couplings which can be repaired without necessitating the removal of the valve or valves controlling the connections between the particular sight-feed devices and the lubricator-cup.

Having thus described my invention, what I claim as new, and desire to secure by Letters Patent, is—

1. A lubricator comprising the cup, the couplings connected with the cup and held in fixed relation to each other, valve devices controlling communication between the couplings and the cup, and the sight-feed devices each comprising a transversely-extending sight-cylinder having end plates of glass and means for securing the glass plates detachably in place and each of said cylinders being provided at its upper and lower sides with threaded nipples and the pipe-sections threaded at one end on said nipples and connected at their other ends with their respective couplings substantially as set forth.

2. The combination of the lubricator-cup, couplings in communication therewith and held in fixed relation to each other valve devices controlling communication between the couplings and the cup and a sight-feed device arranged between the couplings and having a glass portion or portions through which the feed may be seen and means between said couplings for securing the said glass portion or portions so the latter may be renewed at a point between the couplings substantially as set forth.

OLIVER E. GAY.

Witnesses:
B. H. Bunn,
J. P. Bunn.